INVENTOR
RAE A. PROSSER

_United States Patent Office_ 3,068,017
Patented Dec. 11, 1962

3,068,017
HIGH PRESSURE PACKING ADAPTOR
Rae A. Prosser, South Charleston, W. Va., assignor to Union Carbide Corporation, a corporation of New York
Filed Oct. 19, 1959, Ser. No. 847,242
5 Claims. (Cl. 277—117)

This invention relates to an improved packing for the sealing of high pressure reciprocating pump shafts and the like. More particularly, it relates to a special female adaptor for V-ring packing used in such service.

The use of V-ring leather or plastic packing in pump stuffing boxes is rather common practice. These rings are used usually arranged as a nest of several with a male metal former at the pressure end and a female former of metal or sometimes leather or plastic at the gland end. It is the female former about which this invention is concerned.

At very high pressures female formers of solid metal are prone to fatigue fracture at the bottom of the V rendering their life very short. This is due to the wedging forces tending to split the V which fails at the point of stress concentration at the bottom of the groove. For some applications this difficulty may be partially overcome by the use of built-up leather formers having the V-groove made of leather, which being resilient are not subject to fracture. However, because of the resilience, the leather does not provide a substantial enough backing for the V-rings at high pressures, and as a result the whole packing assembly is rather short lived.

It is accordingly an object of this invention to provide a female adaptor for high pressure V-ring packing having improved durability and sealing characteristics.

It is a further object to provide such a packing member which substantially avoids stress cracking and extruding of the packing at the bottom of the V notch.

Figure 1:
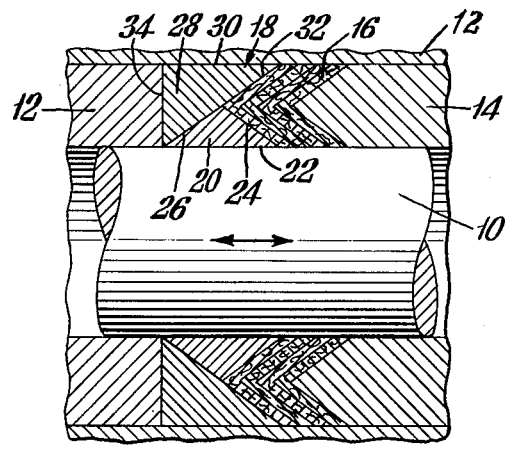
Figure 2:
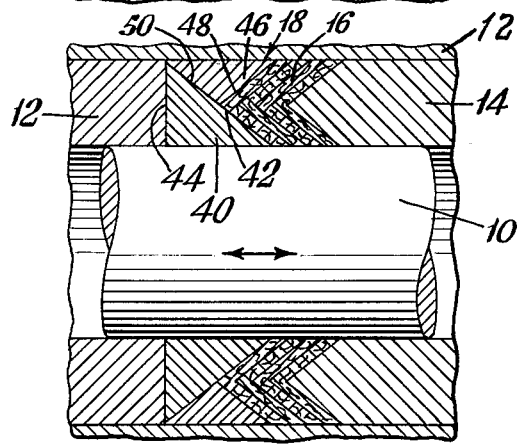
Figure 3:
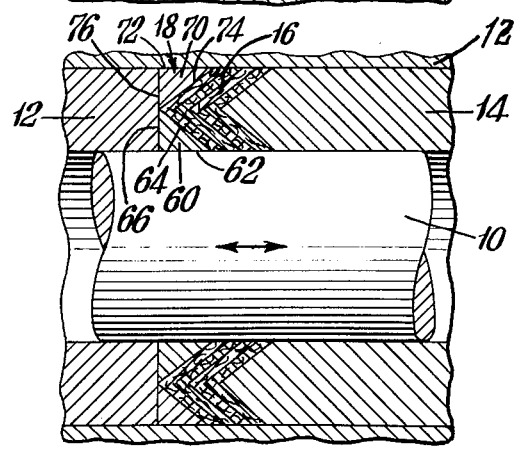

Other objects and advantages will be apparent from the specification and drawings in which:

FIG. 1 is a cross-sectional view of one embodiment of a V ring adaptor according to the invention, FIG. 2 is a cross-section of another embodiment of the V ring adaptor, and FIG. 3 is a cross-section of still another embodiment of a V ring adaptor according to the invention.

The objects of the invention are accomplished in general by a metal female V ring adaptor for use with high pressure packings constructed of two interfitting rings of substantially triangular cross-section the composite having inner and outer concentric surfaces for contacting the wall of a stuffing box and movable shaft respectively. The front face of the adaptor is substantially perpendicular to the inner and outer surfaces and the rear face has a V-shaped groove therein, the sides of the V terminating at the inner and outer surfaces of the composite adaptor.

The instant invention recognizes the advantage of metal as a packing support, and uses to advantage the tendency of the solid piece to split at the bottom of the groove. This is done by making the female adaptor of two fitted rings each of triangular cross-section, one bearing against the outside stuffing box diameter, and the other against the piston rod or plunger. Three embodiments of the invention are possible as shown in FIGS. 1, 2 and 3 wherein like numerals are used to designate like members. The triangular cross-section of the two rings is defined by three surfaces on each ring which in turn define the forward face of the composite adaptor, the inner or pump shaft engaging surface, the outer or stuffing box engaging surface and the two surfaces which form the sides of the V-shaped groove in the rear face of the adaptor.

Referring to FIG. 1, the reciprocating pump shaft 10 moves within the stuffing box 12. The packing assemblage comprises the male metal former 14, the V-ring packing 16, and the female adaptor 18 of the invention. The inner ring 20 has a first cylindrical surface 22 which bears against the pump shaft 10. A second, right conical surface 24 forms one surface of the V-shaped groove in the rear portion of the composite adaptor 18. The third, right conical surface 26 bears against a surface of the outer ring 28 in surface to surface contact throughout their coextensive areas. The outer ring 28 has a first cylindrical surface 30 which bears against the inner stuffing box surface, a second right conical surface 32 which forms the other surface of the V-shaped groove and engages surfaces 26 of the inner ring in surface to surface contact throughout their coextensive areas. A third annular surface 34 forms the front face of the composite adaptor and bears against the end of the stuffing box chamber. Thus the V-shaped groove is formed of surfaces 24 and 32 of the inner and outer rings respectively and the composite adaptor instead of being solid and susceptible to stress cracking at the bottom of the groove is split along the surface to surface contact of the surfaces 26 and 32 of the interfitting rings.

In the embodiment of FIG. 2 the functions of the second and third surfaces of the inner and outer rings of FIG. 1 is reversed so that the third annular surface 44 of the inner ring 40 forms the front surface or face of the composite adaptor and the third right conical surface 50 of outer ring 46 engages the second right conical surface 42 of inner ring 40 in surface to surface contact throughout their coextensive areas. The two surfaces or sides of the V-groove are formed by the entire second surface 48 of outer ring 46 and the inner portion of the second surface 42 of inner ring 40. In this embodiment the split at the bottom of the V-shaped groove formed by the surface to surface contact of surfaces 42 and 50 of the two interfitting rings is directed outwardly toward the inner surface of the stuffing box rather than inwardly toward the pump shaft as in the embodiment of FIG. 1.

In the embodiment of FIG. 3 first conical surfaces 62 and 72 of the inner and outer rings 60 and 70 respectively bear against the pump shaft 10 and inner surface of the stuffing box 12. The front surface or face of the composite adaptor 18 is formed by the two annular third surfaces 66 and 76. The two surfaces of the V-groove in the composite adaptor are formed by the second right conical surfaces 64 and 74 of the inner and outer rings. In this embodiment the split at the bottom of the V-groove is a circular line formed by the engagement of the edges of the inner and outer rings formed by the intersection of surfaces 64, 66 and 74, 76 respectively.

In each of the three embodiments the female packing adaptor being split to begin with does not open to allow packing to extrude into the opening. Instead, the separation of parts is prevented by pressure. As pressure is applied to the composite adaptor either by tightening of the packing nuts or by motion of the pump shaft, the outer ring is expanded outward against the stuffing box wall and the inner ring is expanded inward against the plunger. The closeness of fit necessary initially is thereby helped by the pressure to become even closer. By the same means wear of the inner ring around the moving rod or plunger is compensated for to some extent by its formation inward against the rod.

While the interfitting rings making up the composite adaptor have been shown to be precisely triangular in cross-section it is to be understood that the portion of the rings forming the front face of the composite adaptor which merely engages the walls of the stuffing box might be extended for increased strength or as a fabricating expedient. Thus the larger of the two rings shown in the embodiments of FIGS. 1 and 2 could be made from short tubular sections of such size as to fit snugly within the stuffing box with a bevel cut on one end thereof to form the surface which in turn forms one side of the V-shaped groove and engages in surface to surface contact the second surface of the smaller ring.

The materials used in the instant V-ring adaptors are subjected to great wear due to the pressures encountered and also to the reciprocating shaft movement. They must be hard enough to resist the pressures without deformation and yet be soft enough so as not to score the pump shaft. Such adaptors having good life and otherwise meeting the above conditions have been constructed of bronze.

High pressure packings for reciprocating pump shafts utilizing the composite adaptor of the present invention have given satisfactory service for periods of time up to twenty times that to be expected from packings using customary solid metal or leather female V-ring adaptors. This increase in life expectancy not only saves considerable equipment replacement costs but far more important results in great saving in the labor costs necessary to replace worn or ruptured packings and in the reduction of down time resulting from such repairs.

While the invention has been described with reference to the specific embodiments shown in the drawings, it is to be understood that certain modifications could be made by a person skilled in the art without departing from the spirit and scope of the invention.

What is claimed is:

1. A rigid, non-extrudable composite annular metal female V-ring packing adaptor for use in a stuffing box around a high pressure pump shaft which comprises inner and outer interfitting rings of substantially triangular cross-section, a first surface of the inner ring bearing against the pump shaft and a first surface of the outer ring bearing against an inner surface of the stuffing box, a V-shaped packing-contacting groove formed by respective second surfaces of the inner and outer rings, said second surfaces each being at an angle to and intersecting the first surface of its respective ring.

2. A V-ring adaptor as set forth in claim 1 wherein the third surface of the outer ring forms an annular bearing surface of the composite adaptor and the third surface of the inner ring bears against the second surface of the outer ring in surface to surface contact throughout their coextensive areas.

3. A V-ring adaptor as set forth in claim 1 wherein the third surface of the inner ring forms an annular bearing surface of the composite adaptor and the third surface of the outer ring bears against the second surface of the inner ring in surface to surface contact throughout their coextensive areas.

4. A V-ring adaptor as set forth in claim 1 in which an annular bearing surface of the composite adaptor is formed by respective third surfaces of the inner and outer rings which are substantially in a common plane and in which the line of intersection of the two second surfaces forming the V-shaped groove lies substantially within said plane.

5. A rigid, non-extrudable composite annular metal female V-ring packing adaptor for use around high pressure pump shafts which comprises inner and outer interfitting rings at least one of which is of substantially triangular cross-section, a first surface of the inner ring bearing against the pump shaft and a first surface of the outer ring bearing against an inner surface of a stuffing box, a V-shaped packing-contacting groove formed by respective second surfaces of the inner and outer rings, said second surfaces each being at an angle to and intersecting the first surface of its respective ring.

References Cited in the file of this patent
UNITED STATES PATENTS 453,493    Martin ------------------ June 2, 1891